US012559252B2

(12) United States Patent
Büddefeld et al.

(10) Patent No.: US 12,559,252 B2
(45) Date of Patent: Feb. 24, 2026

(54) SYSTEMS AND METHODS FOR REAL TIME DETERMINATION OF A FUEL LEVEL FOR AN AIRCRAFT

(71) Applicant: THE BOEING COMPANY, Arlington, VA (US)

(72) Inventors: Michael-Christian Büddefeld, Hesse (DE); Hendrik Schöniger, Hesse (DE); Samantha Schwartz, Castle Pines, CO (US); Forest Sutton, Aurora, CO (US)

(73) Assignee: The Boeing Company, Arlington, VA (US)

( * ) Notice: Subject to any disclaimer, the term of this patent is extended or adjusted under 35 U.S.C. 154(b) by 196 days.

(21) Appl. No.: 18/350,791

(22) Filed: Jul. 12, 2023

(65) Prior Publication Data

US 2025/0019091 A1     Jan. 16, 2025

(51) Int. Cl.
B64D 45/00      (2006.01)
G08G 5/34      (2025.01)
G01F 23/80      (2022.01)

(52) U.S. Cl.
CPC .............. B64D 45/00 (2013.01); G08G 5/34 (2025.01); G01F 23/802 (2022.01)

(58) Field of Classification Search
CPC .......... B64D 45/00; G08G 5/34; G01F 23/802
USPC ......................................................... 701/14
See application file for complete search history.

(56) References Cited

U.S. PATENT DOCUMENTS

| | | | | |
|---|---|---|---|---|
| 8,565,944 | B1 * | 10/2013 | Gershzohn | G08G 5/34 |
| | | | | 701/25 |
| 11,156,461 | B1 * | 10/2021 | McCusker | G01C 23/00 |
| 11,170,655 | B2 | 11/2021 | Schwartz | |
| 2014/0309821 | A1 * | 10/2014 | Poux | G08G 5/58 |
| | | | | 701/14 |
| 2016/0031565 | A1 * | 2/2016 | Mohan | B64D 37/26 |
| | | | | 701/3 |
| 2018/0286257 | A1 * | 10/2018 | Schwartz | G08G 5/22 |

FOREIGN PATENT DOCUMENTS

EP          0743580          11/1996

OTHER PUBLICATIONS

Extended European Search Report for EP 24186693.8-1009/4492361, dated Dec. 18, 2024.

* cited by examiner

Primary Examiner — Shardul D Patel
(74) Attorney, Agent, or Firm — Joseph M. Butscher; Carroll, Hoette & Butscher, LLC

(57) ABSTRACT

A system and a method include a control unit configured to determine one or more fuel levels for an aircraft at one or more arrival airports for one or more alternate flight plans that divert from an original flight plan. The control unit is configured to determine the one or more fuel levels based on traffic at the one or more arrival airports, and performance data for the aircraft.

20 Claims, 3 Drawing Sheets

SYSTEMS AND METHODS FOR REAL TIME DETERMINATION OF A FUEL LEVEL FOR AN AIRCRAFT

FIELD OF THE DISCLOSURE

Examples of the present disclosure generally relate to systems and methods for determining fuel levels of aircraft, such as for alternate flight plans, during a flight of the aircraft.

BACKGROUND OF THE DISCLOSURE

Aircraft are used to transport passengers and cargo between various locations. Numerous aircraft depart from and arrive at a typical airport every day.

An aircraft flies from a departure airport to an arrival airport according to a flight plan. For various reasons, the aircraft may need to divert from the flight plan. For example, inclement weather between the departure airport and the arrival airport may cause a pilot to divert from the flight plan around the inclement weather. Diverting from the original flight plan can therefore change fuel consumption, as the diverted route may cause the aircraft to burn more fuel than originally expected. In some cases, a pilot may divert to an alternate airport, as the aircraft may not have sufficient fuel to arrive at the originally planned arrival airport.

Accordingly, when an aircraft needs to divert from an original flight plan, a pilot typically needs to make a quick operational decision, which is generally based on gut feeling, experience, and/or reliance on fuel safety buffers, rather than a deliberate calculation of fuel demand. Additionally, in certain situations, a pilot may fly in a holding pattern and/or a delay maneuver until forced to proceed to an alternate airport due to a lack of fuel to continue to hold.

SUMMARY OF THE DISCLOSURE

A need exists for a system and a method for efficiently and effectively informing a pilot of fuel estimates for one or more alternate flight plans during a flight. Further, a need exists for such a system and method that operates in real time.

With those needs in mind, certain examples of the present disclosure provide a system including a control unit configured to determine one or more fuel levels for an aircraft at one or more arrival airports for one or more alternate flight plans that divert from an original flight plan. The control unit is configured to determine the one or more fuel levels based on traffic at the one or more arrival airports, and performance data for the aircraft.

In at least one example, the control unit is configured to determine the one or more fuel levels when the aircraft is in flight after the aircraft departed a departure airport, and before the aircraft lands at any of the one or more arrival airports.

The control unit can be configured to determine the one or more fuel levels based further on one or more notifications. The one or more notifications can include information regarding current weather at the one or more arrival airports, forecasted weather at the one or more arrival airports, required procedures, and/or existing curfews at the one or more arrival airports.

In at least one example, the performance data includes information operational capabilities of the aircraft.

The control unit can be further configured to determine a current fuel level of the aircraft from information received from one or more fuel sensors of the aircraft.

The control unit can be further configured to automatically discard an alternate flight plan that does not provide the aircraft with sufficient fuel at any of the one or more arrival airports.

In at least one example, a user interface is in communication with the control unit. The user interface includes a display. The control unit is configured to show information regarding the one or more alternate flight plans on the display.

The control unit can be further configured to automatically select one of the one or more alternate flight plans for the aircraft. The aircraft can be automatically operated based on the one of the one or more alternate flight plans.

The control unit can be further configured to express the one or more fuel levels in terms of time.

The control unit can be an artificial intelligence or machine learning system.

Certain examples of the present disclosure provide a method including determining, by a control unit, one or more fuel levels for an aircraft at one or more arrival airports for one or more alternate flight plans that divert from an original flight plan, wherein said determining comprises determining the one or more fuel levels based on traffic at the one or more arrival airports, and performance data for the aircraft, and wherein the performance data includes information operational capabilities of the aircraft.

Certain examples of the present disclosure provide a non-transitory computer-readable storage medium comprising executable instructions that, in response to execution, cause one or more control units comprising a processor, to perform operations comprising: determining one or more fuel levels for an aircraft at one or more arrival airports for one or more alternate flight plans that divert from an original flight plan, wherein said determining comprises determining the one or more fuel levels based on traffic at the one or more arrival airports, and performance data for the aircraft, and wherein the performance data includes information operational capabilities of the aircraft.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Pilots need to determine how their decisions alter fuel consumption to ensure safe operations at all time. With that in mind, examples of the present disclosure provide systems and methods that provide real-time assessment of different potential scenarios for all flight phases. The systems and methods analyze information from various sources to provide aircraft operators a dynamic selection of potential flight phases and standard procedures for the remainder of the flight. For instance, a holding procedure duration for a flight to a certain destination can be based on currently active holding patterns identified by traffic analysis.

Figure 1:
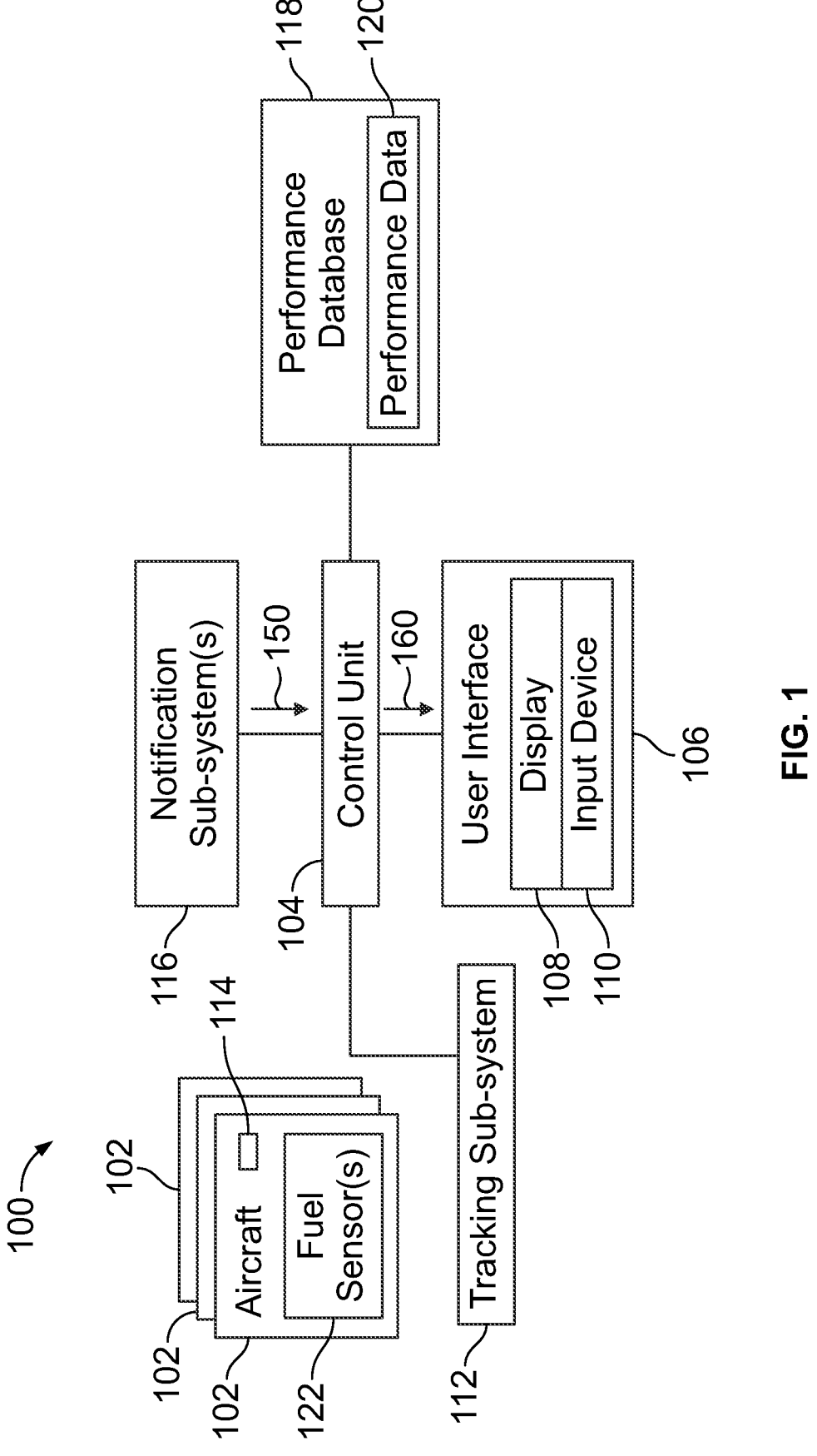
FIG. 1 illustrates a schematic block diagram of a system for determining a fuel level for one or more alternate flight plans for an aircraft, according to an example of the present disclosure.

FIG. 1 illustrates a schematic block diagram of a system 100 for determining a fuel level for one or more alternate flight plans for an aircraft 102, according to an example of the present disclosure. The system 100 includes a control unit 104 in communication with a user interface 106, such as through one or more wired or wireless connections. The user interface 106 includes a display 108 and an input device 110. For example, the display 108 is an electronic monitor, television, and/or the like, and the input device 110 includes one or more of a keyboard, a mouse, a stylus, and/or the like. In at least one example, the display 108 and the input device 110 are integrated as a touchscreen interface. In at least one example, the user interface 106 is a computer workstation. As another example, the user interface 106 is a handheld device, such as a smartphone, smart tablet, or the like. In at least one example, the control unit 104 and the user interface 106 are at a common location, such as at a central monitoring location. As another example, the control unit 104 and the user interface 106 are remote from one another.

In at least one example, an aircraft 102 can include the user interface 106, such as within an internal cabin. In at least one example, each aircraft 102 includes a user interface 106. In at least one example, each aircraft 102 includes a control unit 104 and a user interface 106. For example, the control unit 104 can be part of a flight management computer aboard an aircraft. Optionally, the control unit 104 can be remotely located from the aircraft 102, and in communication with the aircraft 102 through one or more antennas, transceivers, radios, and/or the like.

The control unit 104 is also in communication with a tracking sub-system 112, such as through one or more wired or wireless connections. The tracking sub-system 112 can be remotely located from the control unit 104. The tracking sub-system 112 is configured to track positions of the aircraft 102 within an airspace, such as between different airports. For example, the aircraft 102 include one or more position sensors 114 that are detected and tracked by the tracking sub-system 112. The tracking sub-system 112 can be a radar sub-system. As another example, the tracking sub-system 112 can be an automatic dependent surveillance-broadcast (ADS-B) sub-system.

In at least one example, the position sensor 114 can be an ADS-B transmitter configured to output an ADS-B OUT signal. The ADS-B OUT signal provides information regarding the aircraft 102 within an airspace. For example, the ADS-B OUT signal provides position, heading, speed, altitude, and the like for the aircraft 102. The tracking sub-system 112 is configured to receive the ADS-B OUT signals from the aircraft 102. For example, the tracking sub-system 112 includes an ADS-B receiver that is configured to receive the ADS-B OUT signals from the aircraft 102. In this example, the tracking sub-system 112 is an ADS-B tracking sub-system that determines a current position of an aircraft 102 via satellite navigation through a positional signal (that is, the ADS-B OUT signal) of the aircraft 102 output by the ADS-B transmitter. As another example, the tracking sub-system 112 can be a global positioning system.

The control unit 104 is also in communication with one or more notification sub-systems 116, such as through one or more wired or wireless connections. The control unit 104 can be remotely located from the notification sub-systems 116, and in communication with the notification sub-systems 116 through one or more antennas, transceivers, radios, communication networks (such as private or public internet communications), and/or the like.

In at least one example, the notification sub-systems 116 include Notice to Air Missions (NOTAMs) communication service. A NOTAM is a notice containing information provided to flight personnel. A NOTAM indicates a real-time and abnormal status of a national airspace system.

In at least one example, the notification sub-systems 116 include Meteorological Aerodrome Reports (METAR) communication service. A METAR provides an observation of current surface weather at an airport.

In at least one example, the notification sub-systems 116 includes Terminal Aerodrome (TAF) communication service. A TAF provides a forecast of future weather at an airport.

The control unit 104 is also in communication with a performance database 118 that stores performance data 120 for the aircraft 102. In at least one example, the performance database 118 can be onboard the aircraft 102, such as within a flight computer. As another example, the performance database 118 is remote from the aircraft 102. In at least one example, the performance database 118 is co-located with the control unit 104. As another example, the performance database 118 is remote from the control unit 104.

The performance data 120 includes information regarding operational capabilities of the aircraft 102. For example, the performance data 120 includes information regarding how much fuel the aircraft 102 will burn at a particular airspeed, at a particular altitude, for a particular period of time, etc. In at least one example, the performance data 120 includes one or more performance models for the aircraft 102. The performance models for the aircraft 102 can be predetermined and stored in a memory.

In at least one example, the control unit 104 is also in communication with one or more fuel sensors 122 of the aircraft 102. The fuel sensors 122 detect a current fuel level for the aircraft 102.

Figure 2:
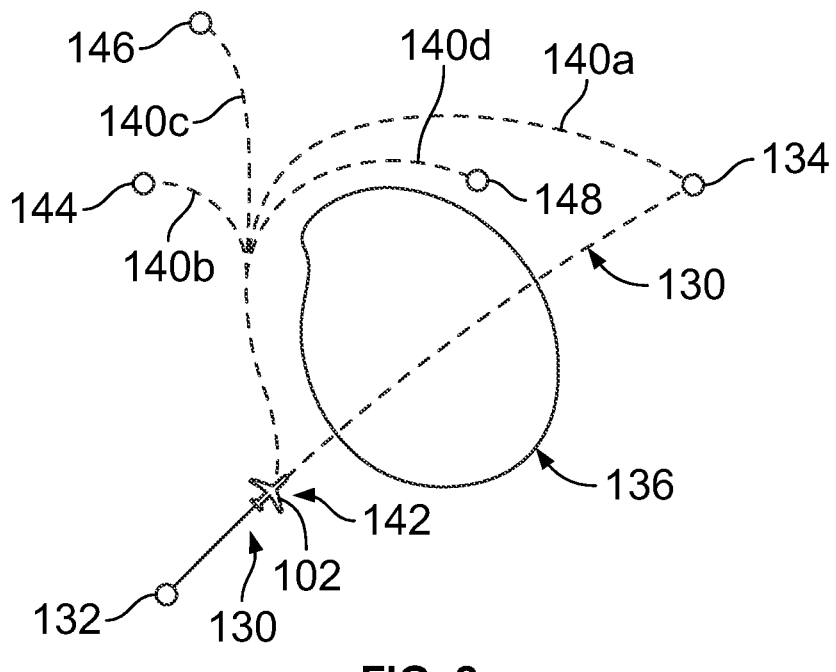
FIG. 2 illustrates a simplified view of various alternate flight plans for an aircraft, according to an example of the present disclosure.

FIG. 2 illustrates a simplified view of various alternate flight plans for an aircraft 102, according to an example of the present disclosure. The aircraft 102 flies according to an original flight plan 130 between a departure airport 132 and an arrival airport 134. During a flight of the aircraft 102, an event 136 within the original flight plan 130 may occur. The event 136 can be inclement weather, a restricted airspace, or the like. As such, a pilot of the aircraft 102 may decide to divert around the event 136 according to an alternate flight plan 140a from a current position 142 to the arrival airport 134. Optionally, the pilot may decide to fly according to an alternate flight plan 140b to an alternate airport 144, an alternate flight plan 140c to an alternate airport 146, or an alternate flight plan 140*d* to an alternate airport 148. More or fewer alternate flight plans than shown may be considered.

As described herein, the system 100 includes the control unit 104, which is configured to determine one or more fuel levels for an aircraft 102 at one or more arrival airports (for example, airports 134, 144, 146, and 148) for one or more alternate flight plans (for example, alternate flight plans 140*a*. 140*b*, 140*c*, and 140*d*) that divert from the original flight plan 130. The control unit 104 is configured to determine the one or more fuel levels based on traffic at the one or more arrival airports, and performance data for the aircraft. In at least one example, the control unit 104 determines the fuel levels when the aircraft 102 is in flight after the aircraft departed the departure airport 132, and before the aircraft 102 lands at one of the arrival airports.

Referring to FIGS. 1 and 2, in operation, the control unit 104 determines a predicted fuel level at each possible arrival airport 134, 144, 146, and 148. For example, the control unit 104 receives notifications 150 from the one more notification sub-systems 116 to determine if a flight plan to the airports is possible, current weather conditions at the airports, and forecasted weather conditions at the airports. Based on such information, the pilot of the aircraft 102 may decide that one or more of the alternate flight plans are undesirable. For example, the pilot may determine that the event 136 adversely affects landing at the airport 148, and may then discard the alternate flight plan 140*d*.

Further, the control unit 104 determines the current fuel level of the aircraft 102 from information received from the fuel sensors(s) and determines if the aircraft 102 has sufficient fuel to travel to the various airports. As an example, the control unit 104 may determine that at the current rate of fuel burn, the distance of a flight plan from the current position 142 to an airport, and performance data 120 regarding the aircraft 102 does not allow the aircraft 102 to arrive at the airport 134 with sufficient fuel as required by one or more regulations. As such, the pilot can then discard the alternate flight plan 140*a* to the arrival airport 134. Optionally, the control unit 104 can automatically discard alternate flight plans that do not provide the aircraft 102 with sufficient fuel.

The control unit 104 can also determine traffic information at a particular airport based on information received form the tracking sub-system 112. For example, the alternate flight plan 140*b* to the airport 144 may be the shortest distance from the current location 142 of the aircraft 102, but the control unit 104 determines that there are a particular number of aircraft scheduled to land before the aircraft 102, which would then cause the aircraft 102 to fly in a holding pattern for a particular period of time. The control unit 104 can then determine that due to the required holding, the aircraft 102 can be scheduled to fly to the airport 146 along the alternate flight plan 140*c* at an earlier time.

Thus, the control unit 104 determines fuel levels for the various alternate flight plans to the original arrival airport 134 and/or one or more alternate airports 144, 146, and/or 148 based on the current location 142 of the aircraft 102, a current fuel level of the aircraft 102, performance data 120 of the aircraft 102 that provides information regarding a predicted fuel consumption based on particular parameters (such as distance, airspeed, altitude, and/or the like), traffic information (for example, a number of aircraft scheduled to land before the aircraft 102, which may cause the aircraft 102 to fly in a holding pattern) at the various airports, and notifications 150 from the notification sub-systems 116, which include current weather, and forecasted weather at the airports. The control unit 104 can present information regarding the alternate flight plans on the display 108. In particular, the control unit 104 can output an alternate flight plan signal 160 to the user interface 106. The alternate flight plan signal 160 includes information regarding the alternate flight plans, which can be shown on the display 108. For example, the control unit 104 can show flight times, holding times, and estimated fuel levels at the airports for each of the alternate flight plans. The pilot can then see the predicted fuel levels at the various airports, and make an informed decision regarding a desired alternate flight plan to select.

In at least one example, the control unit 104 can automatically discard alternate flight plans that result in an insufficient fuel level at an airport. For example, the control unit 104 can determine that based on the distance to the airport 134, a predicted holding time based on traffic at the airport 134, and/or the like, that the aircraft 102 would not have sufficient fuel (as required by regulation) upon landing at the airport 134. As such, the control unit 104 determines that the alternate flight plan 140*a* is unavailable, and may either not present it on the display 108, or provide an alert (such as text, graphical, or flashing alert indicia) on the display 108 that the alternate flight plan 140*a* is unavailable.

In at least one example, the control unit 104 can automatically select (without human intervention) an alternate flight plan based on predetermined criteria. For example, an operator of the aircraft 102 can pre-select criteria such as shortest time to an airport, greatest amount of remaining fuel upon landing, and/or the like via the input device 110, for example. Based on such selection, the control unit 104 can then automatically select an alternate flight plan from the plurality of alternate flight plans. In at least one example, the aircraft 102 may then be automatically operated based on the selected alternate flight plan, whether the alternate flight plan is manually selected by a flight operator, or automatically selected by the control unit 104. For example, the control unit 104 can automatically operate the aircraft 102 based on the selected alternate flight plan.

In at least one example, the control unit 104 automatically determines a time to fly from the current position 142 to each of the alternate airports (such as if based on a local existing curfew at an airport). For example, based on the performance data 120 stored in the performance database 118, the control unit 104 determines an amount of fuel that the aircraft 102 will burn based on the operational capabilities of the aircraft 102 (as contained within the performance data 120), the time of flight, and the like. Such fuel burn can be expressed in fuel weight. The control unit 104 then calculates the time to travel to the airports from the fuel weight that will be burned, and can then express the fuel burn in terms of time (instead of fuel weight) on the display 108. By automatically determining and expressing the fuel burn in terms of time instead of weight, the control unit 104 relieves a flight operator from performing such calculations, which can be difficult under certain stressful conditions (such as when avoiding an inclement weather cell).

As described herein, the control unit 104 analyzes several data sources to determine fuel requirement calculations for various different alternate flight plans. The control unit 104 retrieves information during a flight of the aircraft 102, including destination traffic information (from the tracking sub-system 112), en-route and destination weather information (from the notification sub-system(s) 116), and individual aircraft performance data (from the performance data 120 within the performance database 118). Based on such information, the control unit 104 calculates real-time fuel requirements for the various alternate flight plans. Selection of flight phases, procedures, and events can be performed by an operator, or automatically by the control unit 104 based on situational information and the flight plan details. For example, the flight phases can include holding patterns at a destination airport, special fuel reserves for missed approaches and taxiing, and/or the like. After a selection is made, the control unit 104 calculates required fuel capacity for each phase under consideration. The control unit 104 determines from traffic data the average duration of current holding patterns at each of the airports, and then can compute a required fuel level accordingly. In at least one example, the control unit 104 analyzes information regarding take-off (runway condition reports, weather information, and/or the like), en-route (weather information, traffic information, potential re-routings, and/or the like), descent/approach (weather information, procedures in use based on traffic monitoring, and/or the like), landing/taxiing (runway in use, probable gate/stand position, probability of missed approach, missed approach procedure in use, and/or the like), and the like.

In at least one example, the control unit 104 extracts potential procedures, events, and phases of the flight from supplemental information sources, such as traffic, weather, navigation data, and/or NOTAMs in place. Live data for the aircraft 102 is received from onboard systems in case of an onboard usage or from data provision to the ground in case of usage elsewhere.

In order to represent real time conditions, the control unit 104 aggregates and fuses live data such as traffic events, weather, identified procedures, and/or the like to base fuel calculations the actual, real time situation of the aircraft 102. Examples of the present disclosure provide systems and methods that increase situational awareness, decision-making and comfort of aircraft operators.

Figure 3:
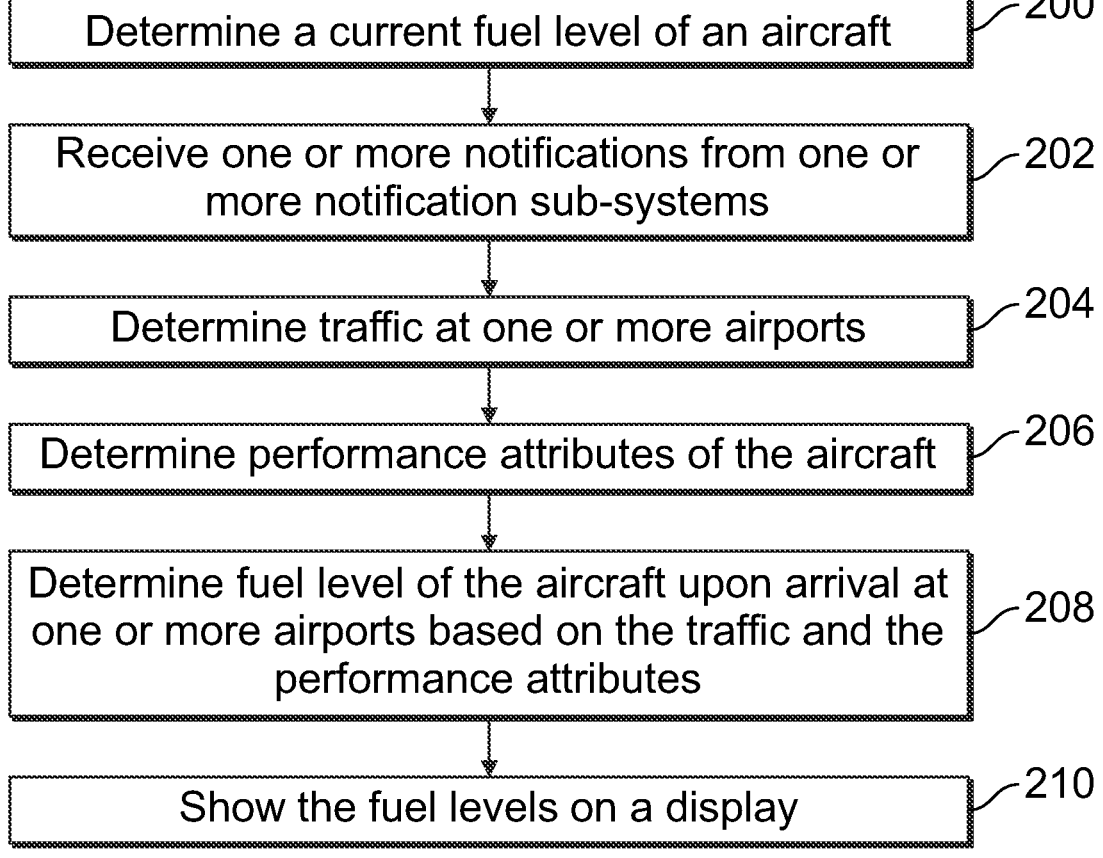
FIG. 3 illustrates a flow chart of a method for determining a fuel level for one or more alternate flight plans for an aircraft, according to an example of the present disclosure.

FIG. 3 illustrates a flow chart of a method for determining a fuel level for one or more alternate flight plans for an aircraft, according to an example of the present disclosure. Referring to FIGS. 1-3, at 200, the control unit 104 determines a current fuel level of the aircraft 102, such as from information received from one or more fuel sensors 122 of the aircraft 102. At 202, the control unit 104 receives one or more notifications from one or more notification sub-system 116. The notifications include information regarding one or more of current weather at one or more airports, forecasted weather (such as within the next 6 to 12 hours) at the one or more airports, required procedures for landing at the one or more airports, and/or the like.

At 204, the control unit 104 determines traffic at the one or more airports, such as from information received from the tracking sub-system 112. The traffic includes a number of aircraft that are to land or take-off in front of the aircraft 102, an average holding time before landing at the one or more airports, and/or the like.

At 206, the control unit 104 determines performance attributes of the aircraft 102. The performance attributes include information within performance data 120 for the aircraft 102. The performance data 120 can be or otherwise include a predetermined performance model. The performance data 120 includes a rate of fuel burn when the aircraft 102 flies at one or more airspeeds, at one or more altitudes, with one or headwinds or tailwinds, for one or more periods of time, etc.

At 208, the control unit 104 determines one or more fuel levels of the aircraft 102 upon arrival at the one or more airports based on the traffic and the performance attributes. The control unit 104 may calculate and express the fuel levels in terms of time. For example, the control unit 104 may determine that an alternate flight plan that arrives at a particular airport leaves the aircraft 102 with four hours of remaining fuel.

At 210, the control unit 104 shows the fuel levels upon arrival for the alternate flight plans on the display 108. The control unit 104 can allow a flight operator to select an alternate flight plan from the plurality of alternate flight plans, which can be shown or otherwise communicated on the display 108. As another option, the control unit 104 can automatically select an alternate flight plan.

Figure 4:
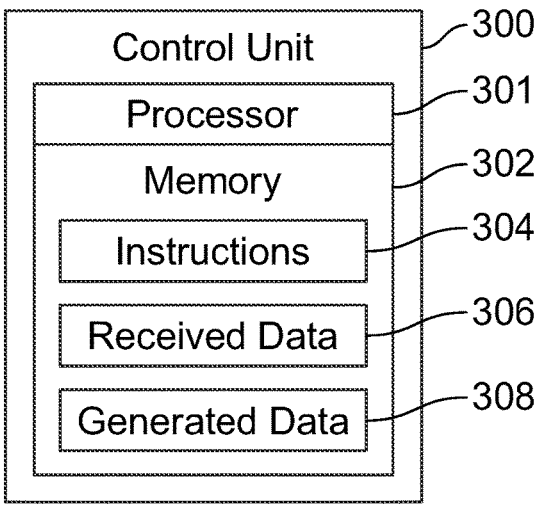
FIG. 4 illustrates a schematic block diagram of a control unit, according to an example of the present disclosure.

FIG. 4 illustrates a schematic block diagram of a control unit 300, according to an example of the present disclosure. The control unit 104 can be configured as the control unit 300. In at least one example, the control unit 300 includes at least one processor 301 in communication with a memory 302. The memory 302 stores instructions 304, received data 306, and generated data 308. The control unit 300 shown in FIG. 4 is merely exemplary, and non-limiting.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 104 may be or include one or more processors that are configured to control operation, as described herein.

The control unit 104 is configured to execute a set of instructions that are stored in one or more data storage units or elements (such as one or more memories), in order to process data. For example, the control unit 104 may include or be coupled to one or more memories. The data storage units may also store data or other information as desired or needed. The data storage units may be in the form of an information source or a physical memory element within a processing machine.

The set of instructions may include various commands that instruct the control unit 104 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 104. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 104 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Referring to FIGS. 1-4, examples of the subject disclosure provide systems and methods that allow large amounts of data to be quickly and efficiently analyzed by a computing device. For example, the control unit 104 can analyze various aspects of aircraft 102, traffic, notifications, and the like. As such, large amounts of data, which may not be discernable by human beings, are being tracked and analyzed. The vast amounts of data are efficiently organized and/or analyzed by the control unit 104, as described herein. The control unit 104 analyzes the data in a relatively short time in order to quickly and efficiently determine fuel levels for various alternate flight plans for the aircraft 102. A human being would be incapable of efficiently analyzing such vast amounts of data in such a short time. As such, examples of the present disclosure provide increased and efficient functionality, and vastly superior performance in relation to a human being analyzing the vast amounts of data.

In at least one example, components of the system 100, such as the control unit 104, provide and/or enable a computer system to operate as a special computer system for automatically determining fuel levels for alternate flight plans. The control unit 104 improves upon standard computing devices by determining such information in an efficient and effective manner.

In at least one example, all or part of the systems and methods described herein may be or otherwise include an artificial intelligence (AI) or machine-learning system that can automatically perform the operations of the methods also described herein. For example, the control unit 104 can be an artificial intelligence or machine learning system. These types of systems may be trained from outside information and/or self-trained to repeatedly improve the accuracy with how data is analyzed to automatically determine fuel levels at arrival airports for alternate flight plans. Over time, these systems can improve by determining such information with increasing accuracy and speed, thereby significantly reducing the likelihood of any potential errors. For example, the AI or machine-learning systems can learn and determine the performance capabilities of aircraft, traffic at airports, and the like, and automatically determine the alternate flight plans and resulting fuels levels at arrival airports. The AI or machine-learning systems described herein may include technologies enabled by adaptive predictive power and that exhibit at least some degree of autonomous learning to automate and/or enhance pattern detection (for example, recognizing irregularities or regularities in data), customization (for example, generating or modifying rules to optimize record matching), and/or the like. The systems may be trained and re-trained using feedback from one or more prior analyses of the data, ensemble data, and/or other such data. Based on this feedback, the systems may be trained by adjusting one or more parameters, weights, rules, criteria, or the like, used in the analysis of the same. This process can be performed using the data and ensemble data instead of training data, and may be repeated many times to repeatedly improve the determination of fuel levels for alternate flight plans. The training minimizes conflicts and interference by performing an iterative training algorithm, in which the systems are retrained with an updated set of data (for example, data received before, during, and/or after each flight of the aircraft 102) and based on the feedback examined prior to the most recent training of the systems. This provides a robust analysis model that can better determine situational information in a cost effective and efficient manner.

Figure 5:
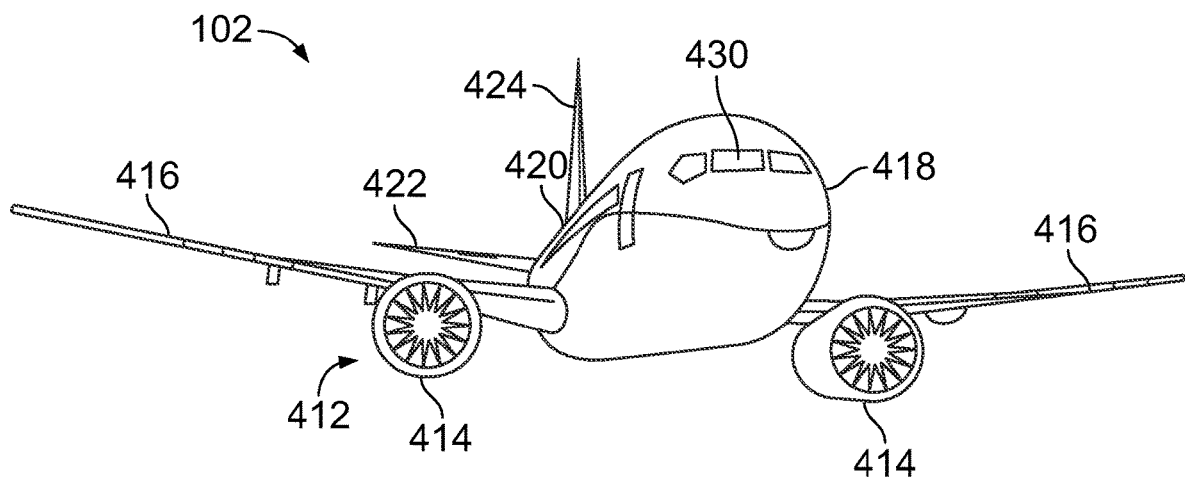
FIG. 5 illustrates a perspective front view of an aircraft, according to an example of the present disclosure.

FIG. 5 illustrates a perspective front view of an aircraft 102, according to an example of the present disclosure. The aircraft 102 includes a propulsion system 412 that includes engines 414, for example. Optionally, the propulsion system 412 may include more engines 414 than shown. The engines 414 are carried by wings 416 of the aircraft 102. In other examples, the engines 414 may be carried by a fuselage 418 and/or an empennage 420. The empennage 420 may also support horizontal stabilizers 422 and a vertical stabilizer 424. The fuselage 418 of the aircraft 102 defines an internal cabin 430, which includes a flight deck or cockpit, one or more work sections (for example, galleys, personnel carry-on baggage areas, and the like), one or more passenger sections (for example, first class, business class, and coach sections), one or more lavatories, and/or the like. FIG. 5 shows an example of an aircraft 102. It is to be understood that the aircraft 102 can be sized, shaped, and configured differently than shown in FIG. 5.

Further, the disclosure comprises examples according to the following clauses:

Clause 1. A system comprising:

a control unit configured to determine one or more fuel levels for an aircraft at one or more arrival airports for one or more alternate flight plans that divert from an original flight plan, wherein the control unit is configured to determine the one or more fuel levels based on traffic at the one or more arrival airports, and performance data for the aircraft.

Clause 2. The system of Clause 1, wherein the control unit is configured to determine the one or more fuel levels when the aircraft is in flight after the aircraft departed a departure airport, and before the aircraft lands at any of the one or more arrival airports.

Clause 3. The system of Clauses 1 or 2, wherein the control unit is configured to determine the one or more fuel levels based further on one or more notifications.

Clause 4. The system of Clause 3, wherein the one or more notifications include information regarding current weather at the one or more arrival airports, forecasted weather at the one or more arrival airports, and required procedures at the one or more arrival airports.

Clause 5. The system of any of Clauses 1-4, wherein the performance data includes information operational capabilities of the aircraft.

Clause 6. The system of any of Clauses 1-5, wherein the control unit is further configured to determine a current fuel level of the aircraft from information received from one or more fuel sensors of the aircraft.

Clause 7. The system of any of Clauses 1-6, wherein the control unit is further configured to automatically discard an alternate flight plan that does not provide the aircraft with sufficient fuel at any of the one or more arrival airports.

Clause 8. The system of any of Clauses 1-7, further comprising a user interface in communication with the control unit, wherein the user interface comprises a display, and wherein the control unit is configured to show information regarding the one or more alternate flight plans on the display.

Clause 9. The system of any of Clauses 1-8, wherein the control unit is further configured to automatically select one of the one or more alternate flight plans for the aircraft.

Clause 10. The system of Clause 9, wherein the aircraft is automatically operated based on the one of the one or more alternate flight plans.

Clause 11. The system of any of Clauses 1-10, wherein the control unit is further configured to express the one or more fuel levels in terms of time.

Clause 12. The system of any of Clauses 1-11, wherein the control unit is an artificial intelligence or machine learning system.

Clause 13. A method comprising:

determining, by a control unit, one or more fuel levels for an aircraft at one or more arrival airports for one or more alternate flight plans that divert from an original flight plan, wherein said determining comprises determining the one or more fuel levels based on traffic at the one or more arrival airports, and performance data for the aircraft, and wherein the performance data includes information operational capabilities of the aircraft.

Clause 14. The method of Clause 13, wherein said determining, by the control unit, occurs when the aircraft is in flight after the aircraft departed a departure airport, and before the aircraft lands at any of the one or more arrival airports.

Clause 15. The method of Clauses 1 or 14, wherein said determining, by the control unit, further comprises determining the one or more fuel levels based further on one or more notifications, and wherein the one or more notifications include information regarding current weather at the one or more arrival airports, forecasted weather at the one or more arrival airports, required procedures, and existing curfews at the one or more arrival airports.

Clause 16. The method of any of Clauses 13-15, further comprising determining, by the control unit, a current fuel level of the aircraft from information received from one or more fuel sensors of the aircraft.

Clause 17. The method of any of Clauses 13-16, further comprising showing, by the control unit, information regarding the one or more alternate flight plans on a display of a user interface.

Clause 18. The method of any of Clauses 13-17, further comprising:

automatically selecting, by the control unit, one of the one or more alternate flight plans for the aircraft; and
automatically operating the aircraft based on the one of the one or more alternate flight plans.

Clause 19. The method of any of Clauses 13-18, further comprising expressing, by the control unit, the one or more fuel levels in terms of time.

Clause 20. A non-transitory computer-readable storage medium comprising executable instructions that, in response to execution, cause one or more control units comprising a processor, to perform operations comprising:

determining one or more fuel levels for an aircraft at one or more arrival airports for one or more alternate flight plans that divert from an original flight plan, wherein said determining comprises determining the one or more fuel levels based on traffic at the one or more arrival airports, and performance data for the aircraft, and wherein the performance data includes information operational capabilities of the aircraft.

As described herein, examples of the present disclosure provide systems and methods for efficiently and effectively informing a pilot of fuel estimates for one or more alternate flight plans during a flight. Further, in at least one example, the systems and methods operate in real time.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
an aircraft including one or more fuel sensors configured to detect a current fuel level of the aircraft; and
a control unit including one or more processors, wherein the control unit is in communication with the one or more fuel sensors, and wherein the control unit is configured to:
  receive information from the one or more fuel sensors of the aircraft to determine the current fuel level of the aircraft,
  determine fuel levels for the aircraft upon landing at one or more arrival airports for alternate flight plans that divert from an original flight plan based on traffic at the one or more arrival airports, and performance data for the aircraft.

2. The system of claim 1, wherein the control unit is configured to determine the fuel levels when the aircraft is in flight after the aircraft departed a departure airport, and before the aircraft lands at any of the one or more arrival airports.

3. The system of claim 1, wherein the control unit is configured to determine the fuel levels based further on one or more notifications.

4. The system of claim 3, wherein the one or more notifications include information regarding current weather at the one or more arrival airports, forecasted weather at the one or more arrival airports, and required procedures at the one or more arrival airports.

5. The system of claim 1, wherein the performance data includes one or more performance models for the aircraft, wherein the one or more performance models provide information regarding operational capabilities of the aircraft.

6. The system of claim 1, wherein the control unit is further configured to automatically discard any one of the alternate flight plans that does not provide the aircraft with sufficient fuel at any of the one or more arrival airports.

7. The system of claim 1, further comprising a user interface in communication with the control unit, wherein the user interface comprises a display, and wherein the control unit is configured to show information regarding the alternate flight plans on the display.

8. The system of claim 1, wherein the control unit is further configured to automatically select one of the alternate flight plans for the aircraft.

9. The system of claim 8, wherein the aircraft is automatically operated based on one of the one or more alternate flight plans.

10. The system of claim 1, wherein the control unit is further configured to express the fuel levels in terms of time including a number of hours of remaining fuel.

11. The system of claim 1, wherein the control unit is an artificial intelligence or machine learning system.

12. The system of claim 1, wherein the aircraft is configured to be operated to fly to one of the one or more airports according to one of the alternate flight plans.

13. A method comprising:
detecting, by one or more fuel sensors of an aircraft, a current fuel level of the aircraft;
receiving, by a control unit including one or more processors in communication with the one or more fuel sensors, information regarding the current fuel level of the aircraft from the one or more fuel sensors of the aircraft;

determining, by the control unit, fuel levels for the aircraft upon landing at one or more arrival airports for alternate flight plans that divert from an original flight plan based on traffic at the one or more arrival airports, and performance data for the aircraft, wherein the performance data includes one or more performance models for the aircraft, and wherein the one or more performance models provide information regarding operational capabilities of the aircraft.

14. The method of claim 13, wherein said determining, by the control unit, occurs when the aircraft is in flight after the aircraft departed a departure airport, and before the aircraft lands at any of the one or more arrival airports.

15. The method of claim 13, wherein said determining, by the control unit, further comprises determining the fuel levels based further on one or more notifications, and wherein the one or more notifications include information regarding current weather at the one or more arrival airports, forecasted weather at the one or more arrival airports, required procedures, and existing curfews at the one or more arrival airports.

16. The method of claim 13, further comprising showing, by the control unit, information regarding the alternate flight plans on a display of a user interface.

17. The method of claim 13, further comprising:
automatically selecting, by the control unit, one of the alternate flight plans for the aircraft; and
automatically operating the aircraft based on the one of the alternate flight plans.

18. The method of claim 13, further comprising expressing, by the control unit, the fuel levels in terms of time including a number of hours of remaining fuel.

19. The method of claim 13, further comprising operating the aircraft to fly to one of the one or more airports according to one of the alternate flight plans.

20. A system comprising:
an aircraft including one or more fuel sensors configured to detect a current fuel level of the aircraft;
a control unit including one or more processors, wherein the control unit is in communication with the one or more fuel sensors, and wherein the control unit is configured to:
  receive information from the one or more fuel sensors of the aircraft to determine the current fuel level of the aircraft,
  determine fuel levels for the aircraft upon landing at one or more arrival airports for alternate flight plans that divert from an original flight plan based on traffic at the one or more arrival airports, performance data for the aircraft, and one or more notifications, wherein the performance data includes one or more performance models for the aircraft, wherein the one or more performance models provide information regarding operational capabilities of the aircraft, wherein the one or more notifications include information regarding current weather at the one or more arrival airports, forecasted weather at the one or more arrival airports, and required procedures at the one or more arrival airports, and wherein the control unit is further configured to express the fuel levels in terms of time including a number of hours of remaining fuel, and
  automatically discard any one of the alternate flight plans that does not provide the aircraft with sufficient fuel at any of the one or more arrival airports; and
a user interface in communication with the control unit, wherein the user interface comprises a display, and wherein the control unit is configured to show information regarding the alternate flight plans on the display, wherein the aircraft is configured to be operated to fly to one of the one or more airports according to one of the alternate flight plans.

* * * * *